(12) United States Patent
Bron et al.

(10) Patent No.: US 9,280,158 B2
(45) Date of Patent: Mar. 8, 2016

(54) SYSTEM AND METHOD FOR GUIDING A ROBOT CLEANER ALONG A PATH

(71) Applicant: KONINKLIJKE PHILIPS N.V., Eindhoven (NL)

(72) Inventors: Andries Bron, Eindhoven (NL); Lolke Klaas Salverda, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/405,520

(22) PCT Filed: May 22, 2013

(86) PCT No.: PCT/IB2013/054245
§ 371 (c)(1),
(2) Date: Dec. 4, 2014

(87) PCT Pub. No.: WO2013/182941
PCT Pub. Date: Dec. 12, 2013

(65) Prior Publication Data
US 2015/0134144 A1    May 14, 2015

Related U.S. Application Data

(60) Provisional application No. 61/656,572, filed on Jun. 7, 2012.

(51) Int. Cl.
*G06F 17/00* (2006.01)
*G06F 19/00* (2011.01)
(Continued)

(52) U.S. Cl.
CPC ............ *G05D 1/0225* (2013.01); *G05D 1/0234* (2013.01); *G05D 2201/0203* (2013.01)

(58) Field of Classification Search
CPC .............. G05D 1/0225; G05D 1/0234; G05D 2201/0203; G05D 1/0227; G05D 1/024; G05D 1/0242; G05D 1/0246; G05D 1/0255; G05D 1/027; G05D 1/0272; G05D 1/0274; G05D 2201/0206; G06T 7/0057; G06T 7/204; Y10S 901/01; Y10S 901/09; Y10S 901/47
USPC ............... 701/2; 180/169, 167; 700/245, 218, 700/248; 318/568.11, 568.12
See application file for complete search history.

(56) References Cited

U.S. PATENT DOCUMENTS

| | | | |
|---|---|---|---|
| 7,729,803 B2 * | 6/2010 | Lim | G05D 1/0225 180/167 |
| 8,825,256 B2 | 9/2014 | Kim | |

(Continued)

FOREIGN PATENT DOCUMENTS

JP    58176711 A    10/1983

*Primary Examiner* — Muhammad Shafi (57) ABSTRACT

Disclosed is a method of guiding a mobile robot, comprising: providing a transmitter (110), and having said transmitter transmit a guide signal (300) into a spatially bounded guide signal reception field (302); providing a mobile robot (200) including two mutually adjacently disposed guide signal sensors (210*a*, 210*b*), each configured to generate a reference signal that reflects its reception of the guide signal; and moving the robot along a boundary portion (306) of the guide signal reception field while, based on said reference signals, maintaining a tracking state in which a first of said guide signal sensors (210*a*) is positioned substantially on a first side of said boundary portion, and a second of said guide signal sensors (210*b*) is positioned substantially on an opposite, second side of said boundary portion (306). Also disclosed is a system implementing the method.

15 Claims, 5 Drawing Sheets

(51) Int. Cl.
*B25J 5/00* (2006.01)
*G05D 1/02* (2006.01)

(56) References Cited

U.S. PATENT DOCUMENTS

| | | | | |
|---|---|---|---|---|
| 2005/0231156 A1* | 10/2005 | Yan | | G05D 1/0225 320/107 |
| 2007/0042716 A1* | 2/2007 | Goodall | | H04W 16/18 455/67.11 |
| 2007/0050086 A1* | 3/2007 | Lim | | G05D 1/0225 700/245 |
| 2010/0286825 A1* | 11/2010 | Rew | | A47L 9/009 700/253 |
| 2010/0324736 A1* | 12/2010 | Yoo | | G05D 1/0225 700/259 |
| 2011/0040437 A1* | 2/2011 | Lynch | | G05D 1/0242 701/23 |

* cited by examiner

SYSTEM AND METHOD FOR GUIDING A ROBOT CLEANER ALONG A PATH

This application is the U.S. National Phase application under 35 U.S.C. §371 of International Application No. PCT/IB2013/054245, filed on May 22, 2013, which claims the benefit of U.S. Provisional Application No. 61/656,572 filed on June 7, 2012. These applications are hereby incorporated by reference herein.

FIELD OF THE INVENTION

The present invention relates to a robot cleaner, capable of autonomous travel and cleaning, and more in particular to a system and a method for guiding the robot cleaner along a certain path, e.g. a path leading to a base station.

BACKGROUND OF THE INVENTION

Robotic cleaning systems are known in the art and may typically include a rechargeable battery-powered, autonomously travelling robot cleaner and a stationary base station. The battery enables the robot's temporary autonomy, but requires periodic charging at the base station. The robot and its base station may therefore be fitted with means configured to ensure that the robot cleaner is capable of locating the base station and returning thereto before its battery is exhausted.

In many known robotic cleaning systems, such as the one disclosed in U.S. patent application Ser. No. 11/486,284, use is made of a stationary base station fitted with a plurality of signal transmitters, and a mobile robot cleaner fitted with one or more sensors for receiving the signals transmitted by the signal transmitters on the base station. The signals of the various signal transmitters may differ in code, and each of the signals may be transmitted from the base station in a particular direction so as to be receivable in a certain, generally cone-shaped region extending from the base station. Accordingly, the signals may enable the robot to determine its position relative to the base station, and in particular its presence in a certain region, based on the encoding of the signals it receives.

SUMMARY OF THE INVENTION

A drawback of region-code based homing systems is that the further the robot is away from its base station, the more inaccurate the determination of its relative position becomes. Since the cone-shaped regions narrow in a direction towards the base station, the positional accuracy improves as the robot approaches the base station. Up to the very last moments of the docking process, however, the positional accuracy may be insufficient to enable the robot to make a clean, straight approach that, for instance, ensures that its connection terminals connect with corresponding charge terminals on the base station. Instead, the robot may appear to wiggle towards the base station as it attempts to progress while maintaining its position within the narrowing cone-shaped region, which may make it look clumsy rather than intelligent.

It is an object of the present invention to provide for a system and a method that enable a robot cleaner to be guided smoothly along a well-defined path, such as a path leading to a base station.

To this end, a first aspect of the present invention is directed to a system. The system may comprise a base station including a transmitter configured to transmit a guide signal into a spatially bounded guide signal reception field. The system may also comprise a mobile robot. The robot may include a drive system configured to drive the robot across a floor; two mutually adjacently disposed guide signal sensors, each of which is configured to generate a reference signal that reflects its reception of the guide signal; and a controller that is operably connected to the drive system and the guide signal sensors. The controller may be configured to control the drive system to move the robot along a boundary portion of the guide signal reception field while, based on said reference signals, maintaining a tracking state in which a first of said guide signal sensors is positioned substantially on a first side of said boundary portion, substantially inside of the guide signal reception field, and a second of said guide signal sensors is positioned substantially on a second side of said boundary portion, substantially outside of the guide signal reception field.

A second aspect of the present invention is directed to a mobile robot for tracking a boundary portion of a spatially bounded guide signal reception field into which a guide signal is transmitted by a transmitter. The robot may include a drive system configured to drive the robot across a floor; two mutually adjacently disposed guide signal sensors, each of which is configured to generate a reference signal that reflects its reception of the guide signal; and a controller that is operably connected to the drive system and the guide signal sensors. The controller may be configured to control the drive system to move the robot along a boundary portion of the guide signal reception field while, based on said reference signals, maintaining a tracking state in which a first of said guide signal sensors is positioned substantially on a first side of said boundary portion, inside of the guide signal reception field, and a second of said guide signal sensors is positioned substantially on a second side of said boundary portion, outside of the guide signal reception field.

A third aspect of the present invention is directed to a method of guiding a mobile robot. The method may comprise providing a transmitter, and having said transmitter transmit a guide signal into a spatially bounded guide signal reception field. The method may also comprise providing a mobile robot including two mutually adjacently disposed guide signal sensors, each configured to generate a reference signal that reflects its reception of the guide signal. The method may further comprise moving the robot along a boundary portion of the guide signal reception field while, based on said reference signals, maintaining a tracking state in which a first of said guide signal sensors is positioned substantially on a first side of said boundary portion, inside of the guide signal reception field, and a second of said guide signal sensors is positioned substantially on a second side of said boundary portion, outside of the guide signal reception field.

In the system and method according to the present invention the transmitter may transmit a guide signal into a guide signal reception field, i.e. a region of space within which the guide signal is receivable, and that is bounded by at least one, normally non-physical boundary. On one side of the boundary, within the guide signal reception field, reception of the guide signal may be possible, while on the other side of the boundary, outside of the guide signal reception field, no guide signal may be detectable. The boundary itself may define at least one relatively sharp, i.e. spatially narrow, boundary portion that can be regarded as a guide path or trail to be followed by the mobile robot. To be able to follow this guide path, the robot may be fitted with two adjacently disposed guide signal sensors, each capable of detecting the guide signal and of outputting a reference signal that is indicative of an intensity of the detected guide signal. A significant difference in the strengths of the reference signals may indicate that the guide signal sensors are substantially located on opposite sides of the boundary portion, and thus that the robot is positioned on the guide path laid out by the transmitter. The state in which the sensors are located on opposite sides of the boundary portion may be referred to as the 'tracking state', and this tracking state may be maintained as the robot moves along, and so tracks, the guide path. In particular when the guide path is chosen little fanciful, the above approach may enable the robot to accurately track it in a smooth, seemingly intelligent motion.

The guide signal may in principle be any type of signal capable of being transmitted to effect a guide signal reception field that is bounded by at least one boundary portion across which an intensity of the guide signal falls off rapidly enough to accurately define a narrow and easily detectable guide path. Suitable guide signal types may include acoustic signals, e.g. ultrasound signals, and electromagnetic signals, in particular non-visible light signals, such as ultraviolet light signals or infrared light signals. In an embodiment of the system employing infrared light, for instance, the transmitter may include an infrared light emitter configured to emit an infrared guide signal, while each of the guide signal sensors may include an infrared light receiver sensitive to the infrared guide signal from the infrared light emitter. Embodiments of the disclosed system based on electromagnetic guide signals, and especially infrared guide signals, generally allow for sharply defined guide signal reception fields and thus accurately defined guide paths at relatively low implementation costs.

In an operational condition of the robot on the floor, the guide signal sensors may be disposed at a preferably common tracking height above the floor; in case the guide signal sensors are not disposed at a same or common height, the tracking height may be defined as the average height of the guide signal sensors. Accordingly, the robot may be configured to track a boundary portion of the guide signal reception field at said tracking height (i.e. the boundary portion may coincide with a curve of intersection between the guide signal reception field and a floor-parallel plane at the tracking height). During tracking, the robot may attempt to maintain the tracking state in which one of the guide signal sensors is positioned substantially on a first side of said boundary portion, inside of the guide signal reception field, and the other guide signal sensors is positioned substantially on a second side of said boundary portion, outside of the guide signal reception field. The spacing between the guide signal sensors may thus be approximately equal to a width of the boundary portion at the tracking height, so as to allow for both optimal contrast in the intensity of the guide signal as detected by the two guide signal sensors, and accurate and smooth tracking thereof. It will be appreciated that a guide signal sensor spacing that is not tailored to the width of the boundary portion may prevent proper tracking A guide signal sensor spacing that is significantly smaller than the width of the boundary portion, for example, may prevent the robot from effecting the tracking state in the first place, while a spacing that significantly exceeds the width of the boundary portion may inhibit accurate tracking as it may allow the robot to stray off the guide path without abandoning the tracking state. In this regard, the width of the boundary portion may be construed to be the (minimum) distance across which the guide signal intensity drops at least 75%, and preferably even from full to zero. In a preferred embodiment, the transmitter may be configured to ensure that the at least one boundary portion to be tracked by the robot has a width less than 10 mm, and more preferably less than 5 mm.

The shape of the guide signal reception field, and hence the shape of the boundary portion to be tracked, may be defined by the transmitter and vary for different embodiments. Some embodiments may even include a transmitter that is configured to vary the shape and/or position of the guide signal reception field with time.

In a relatively simple embodiment, for example, the transmitter may be configured to transmit the guide signal into a static, beam-shaped guide signal reception field that extends over the floor. In a floor-parallel plane at the tracking height, the beam may preferably define at least one straight boundary portion. In a practical embodiment the guide signal reception field may be generally cone-shaped, and thus have two straight non-parallel boundaries that extend from the transmitter in said floor-parallel plane at the tracking height.

In another embodiment, the transmitter may not be configured to transmit the guide signal over the floor, but instead be configured to project the guide signal onto the floor. Such an embodiment may rely on the guide signal to be reflected off the floor in order for it to be detectable and trackable by the robot. Accordingly, the reflection of the guide signal off the floor, rather than the guide signal incident on the floor, may define the guide signal reception field that, in a floor-parallel plane at the tracking height of the robot, is bounded by a boundary portion to be tracked. The guide signal sensors may be 'desensitized' to the guide signal incident on the floor by having them face the floor, such that only the reflected guide signal is detectable. An advantage of such an embodiment is that it enables the definition of a non-straight or curved guide path.

In yet another embodiment, the guide signal reception field may not be static, but be dynamic, and for instance vary in location (relative to the normally stationary position of the transmitter) and/or shape with time. For example, in one such embodiment, the transmitter may be configured to effect a guide signal reception field that, seen in a floor-parallel plane at the tracking height of the robot, defines an essentially straight boundary portion that extends in a certain boundary direction from the transmitter, and wherein the transmitter is further configured to vary that boundary direction. The transmitter may in particular vary the boundary direction slowly once the robot has started tracking the boundary portion, such that the robot can be virtually 'tethered' or 'reeled in' along a dynamic guide path determined by the transmitter.

These and other features and advantages of the invention will be more fully understood from the following detailed description of certain embodiments of the invention, taken together with the accompanying drawings, which are meant to illustrate and not to limit the invention.

DETAILED DESCRIPTION

Figure 1A:
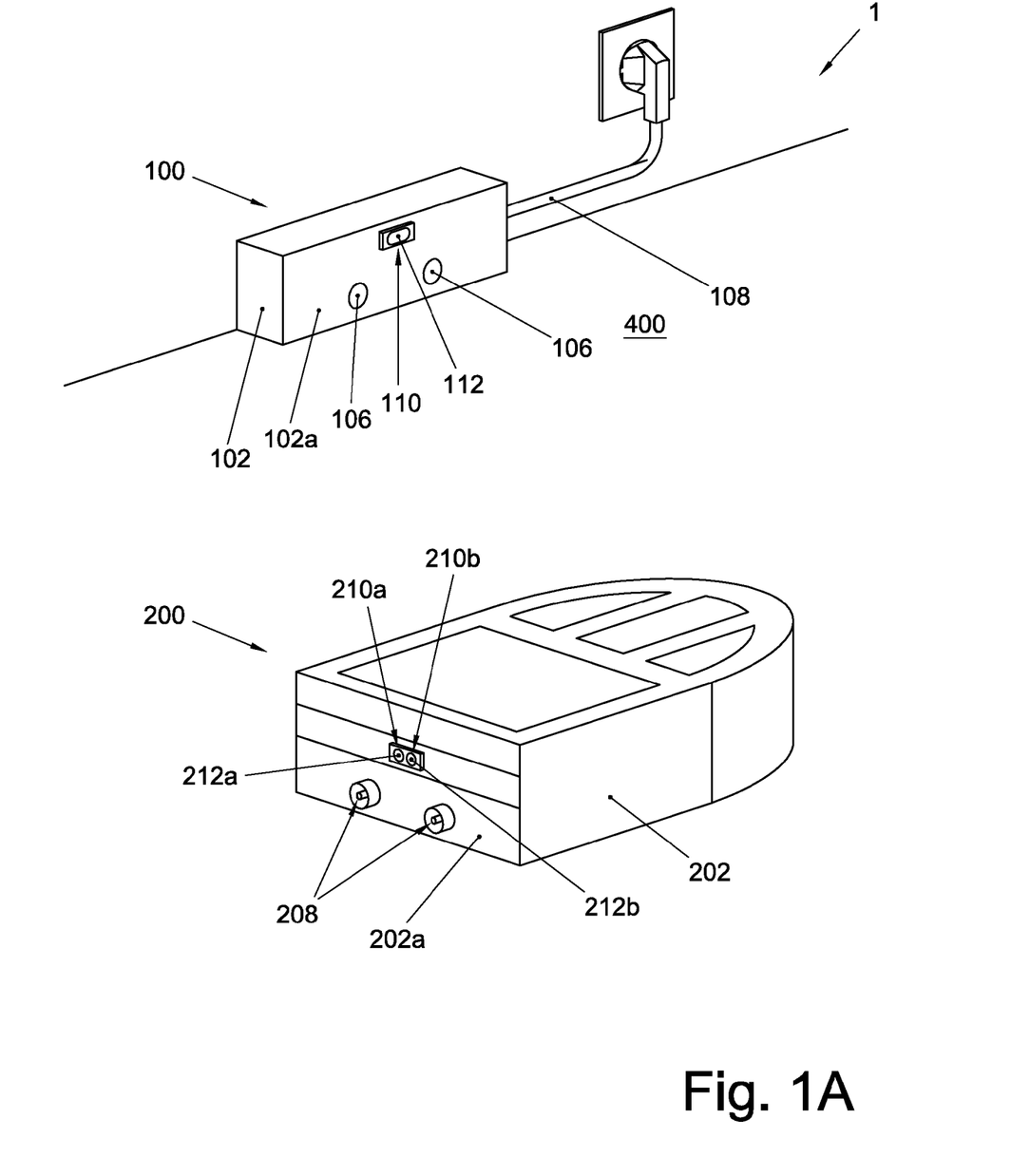
FIG. 1A is a schematic perspective view of an exemplary system according to the present invention, including a base station and a mobile robot capable of docking therewith.
Figure 1B:
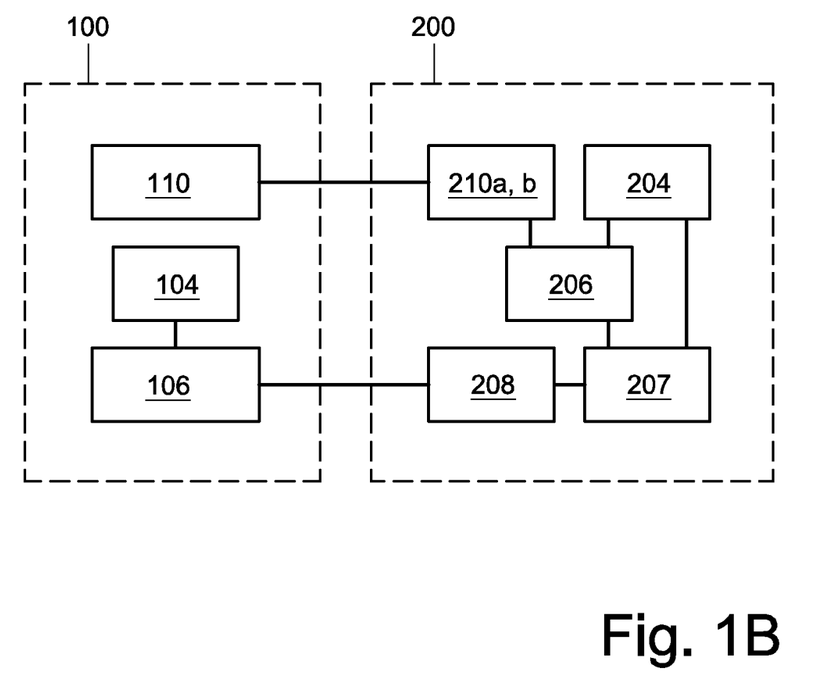
FIG. 1B schematically illustrates the relations between the various components of the system shown in FIG. 1A.

FIG. 1A is a schematic perspective view of an exemplary system 1 according to the present invention, including a base station 100, and a mobile robot 200. The base station 100 and the robot 200 include various components, whose interrelationships are schematically illustrated in FIG. 1B. Referring now to in particular FIGS. 1A and 1B.

The base station 100, with which the robot 200 may dock, may include a housing 102. The housing 102 may accommodate a charger 104, and a transmitter 110. The charger 104 may include two charge terminals 106 positioned at a generally flat front side 102a of the housing 102, and connected to the mains through a power cord 108 and an internal transformer (not shown). In a docked state of the robot 200, the charge terminals 106 may connect to two corresponding connection terminals 208 at the front side 202a of the robot 200 to charge its internal rechargeable battery 207.

The transmitter 110 may also be positioned at the front side 102a of the housing 102. In the depicted embodiment, the transmitter 100 includes an infrared light emitter 112, e.g. an infrared laser diode or infrared LED, configured to emit an infrared guide signal. Since the operation of the presently disclosed system 1 does not rely on multiple transmitters 110/infrared light emitters 112 emitting multiple guide signals that differ in (region) code, one infrared light emitter 112 may typically suffice. In general, the transmitter 110 may be configured to transmit a guide signal 300 into a guide signal reception field 302 bounded by a boundary 304 that includes at least one spatially narrow boundary portion 306 to be tracked by the robot 200 (see FIGS. 2-4). The boundary portion may preferably have a width less than 10 mm, within which width an intensity of the guide signal may drop at least 75%.

As will be clarified with reference to FIGS. 2-4 below, the shape of the guide signal reception field 302, and hence the shape of the boundary portion 306 to be tracked, may be defined by the transmitter 110 and vary for different embodiments. Some embodiments may include a transmitter 110 that is configured to vary the shape and/or position of the guide signal reception field with time. To effect a guide signal reception field 302 with a desired static or dynamic boundary portion 306, the infrared light emitter 112 may embody projection means that enable it to suitably project the guide signal 300 into space, e.g. over or onto the floor. Such projection means may in themselves be of a generally conventional design, and for instance include one or more (infrared) lenses, mirrors and/or optical masks, and, in particular in the case of an embodiment featuring a dynamic guide signal reception field, one or more electromotors for moving the lenses, mirrors and/or masks.

The robot 200 may include a housing 202, which may at least partly accommodate a drive system 204—for instance including a set of wheels and an electromotor—for driving the robot across the floor 400, two guide signal sensors 210a, 210b, a controller 206 that is operably connected to both the drive system 204 and the guide signal sensors 210a, 210b and configured to control the drive system based on reference signals outputted by the guide signal sensors, and a rechargeable battery 207 that powers both the drive system 204 and the controller 206. The battery 207 may be fitted with the aforementioned two connection terminals 208 that may be disposed at a generally flat front side 202a of the housing 202 to connect to the charge terminals 106 on the base station 100 in a docked condition of the robot 200. In embodiment wherein the robot 200 is a robotic vacuum cleaner, it may additionally include (vacuum) suction means, rotatably drivable brushes, and an internal dust container, which, as one skilled in the art will appreciate, are well known features in the art.

The guide signal sensors 210a, 210b may be mutually adjacently disposed at the front side 202a of the robot's housing 202, at a common tracking height above the floor. The spacing between the guide signal sensors 210a, 210b may be approximately equal to the width of the boundary portion 306 of the guide signal reception field 304 to be tracked, and typically be less than 10 mm. It is understood that each of the guide signal sensors 120a,b may include an infrared light receiver 212a, 212b that is sensitive to the infrared guide signal from the infrared light emitter 112 of the base station 100.

The controller 206 of the robot 200 may include a processor configured to execute a movement routine or program involving instructions for the drive system 204 to move the robot 200 across the floor 400 in a certain pattern. More specifically, the controller 206 may be configured to control the drive system 204 at least partly based on the reference signals outputted by the guide signal sensors 210a, 210b, and—in particular when a low battery charge is detected and/or a certain movement routine, e.g. a cleaning routine, has been completed—to thereby actively seek, detect and follow a boundary portion 306 of the guide signal reception field 302 provided by the transmitter 110 of the base station 100. To locate the guide signal reception field 302, the controller may, for instance, drive the robot 200 randomly across the floor until one or both of the guide signal sensors 210a, 210b register the guide signal 300. Once the guide signal reception field 302 has been located and optionally entered, the controller 206 may attempt to locate the boundary portion to be tracked 306 by randomly driving towards the boundaries of the guide signal reception field 302 (detectable through the loss of guide signal reception by at least one of the guide signal sensors 210a, 210b), and to determine whether a tracking state may be effected at the detected boundary. In this regard it is worth noting that, in the embodiments of FIGS. 2-4, the left guide signal sensor 210b of the robot 200 is (arbitrarily) selected as the one that, in the tracking state, is positioned substantially on the outside of the tracked boundary portion 306 of the guide signal reception field 302, while the right guide signal sensor 210a is selected as the one that is positioned on the inside of the tracked boundary portion 306. Accordingly, in case a boundary of the guide signal reception field 302 is detected first through loss of guide signal reception for the right guide signal sensor 210a, the controller 206 may conclude that the robot 200 is on the wrong side of the guide signal reception field 302, and drive it to an opposite side, towards the boundary portion 306 to be tracked. Once the boundary portion 306 to be tracked has been located, the controller 206 may initiate a boundary portion following routine that drives the robot 200 along the boundary portion 306 while maintaining the tracking state, so as to smoothly move towards the base station.

Various contemplated implementations of the system 1 according to the present invention will now be described briefly with reference to FIGS. 2-4, which illustrate the system 1 during operation. The robot 200 is each time shown tracking a boundary portion 306 of the guide signal reception field 302 effected by the transmitter 110 of the base station 100.

Figure 2:
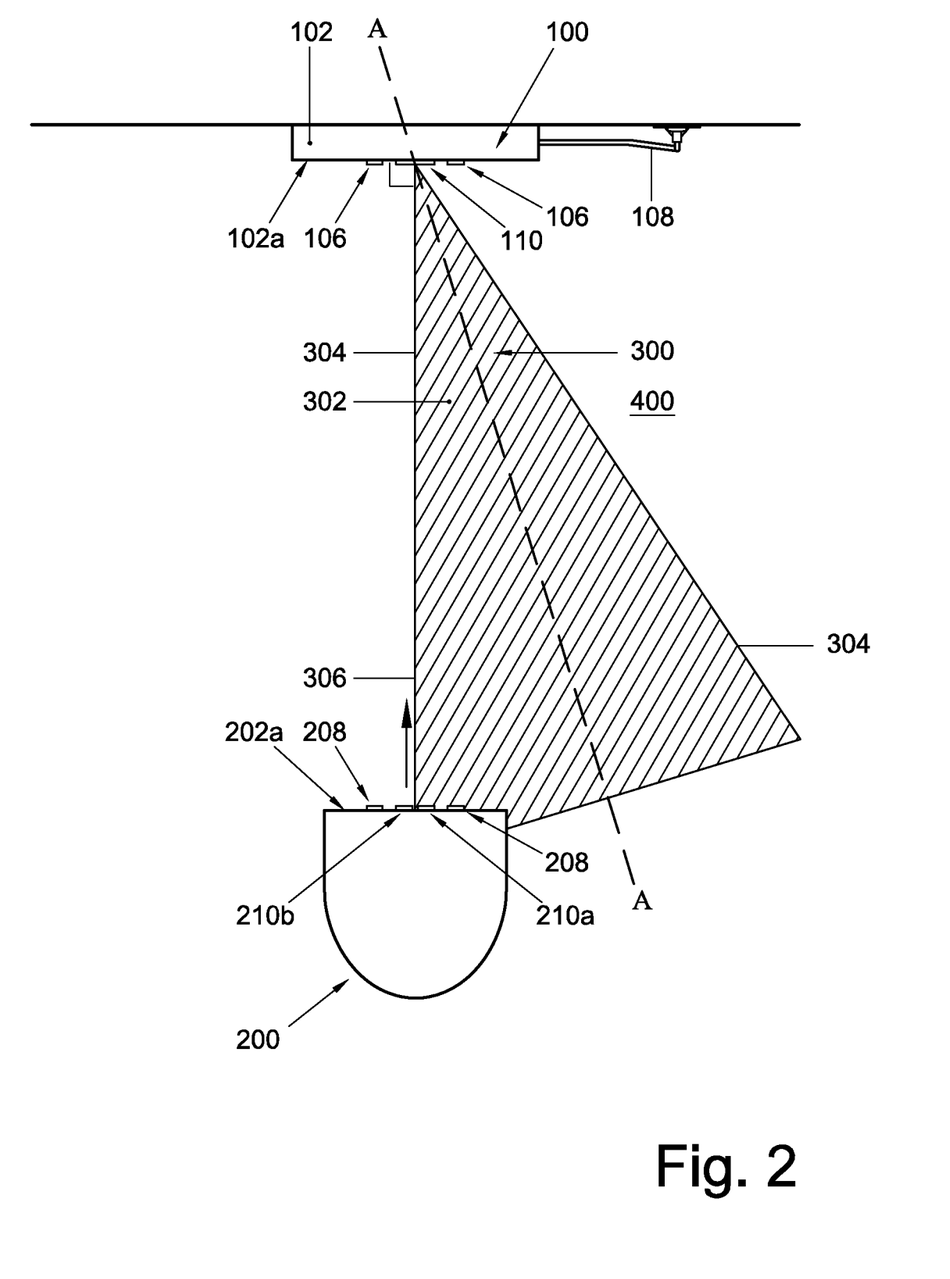
FIG. 2 is a schematic top view of the system of FIG. 1 during operation, illustrating how the robot follows a straight boundary portion of a generally cone-shaped guide signal reception field generated by a transmitter of the base station.

In the embodiment of FIG. 2, the transmitter 110 on the base station 100 is configured to transmit the guide signal 300 into a static, beam-shaped guide signal reception field 302 that extends over the floor 400. The guide signal reception field 302 may be generally cone-shaped. In a floor-parallel plane at the tracking height of the robot 200, the guide signal reception field 302 may thus define two straight non-parallel boundary portions 304 that converge in the direction of the transmitter 110. From the fact that the tracking state in the depicted embodiment is defined as the configuration wherein the left and right guide signal sensors 210b, 210a of the robot 200 are respectively positioned on the outside and on the inside of the tracked boundary portion, it follows that the boundary portion 304 to be tracked is that labelled 306.

It may be noted that the transmitter 110 on the base station 100 has been configured such that the boundary portion 306 to be tracked extends substantially perpendicular to the generally flat front side 102a of the housing 102 of the base station 100. Accordingly, when the robot 200 tracks its way to the base station along the boundary portion 306, it may move seemingly intelligently and in a generally straight line until, eventually, its own generally flat front side 202a neatly mates with the generally flat front side 102a of the housing, and its connection terminals 208 connect to the charge terminals 106.

Figure 3:
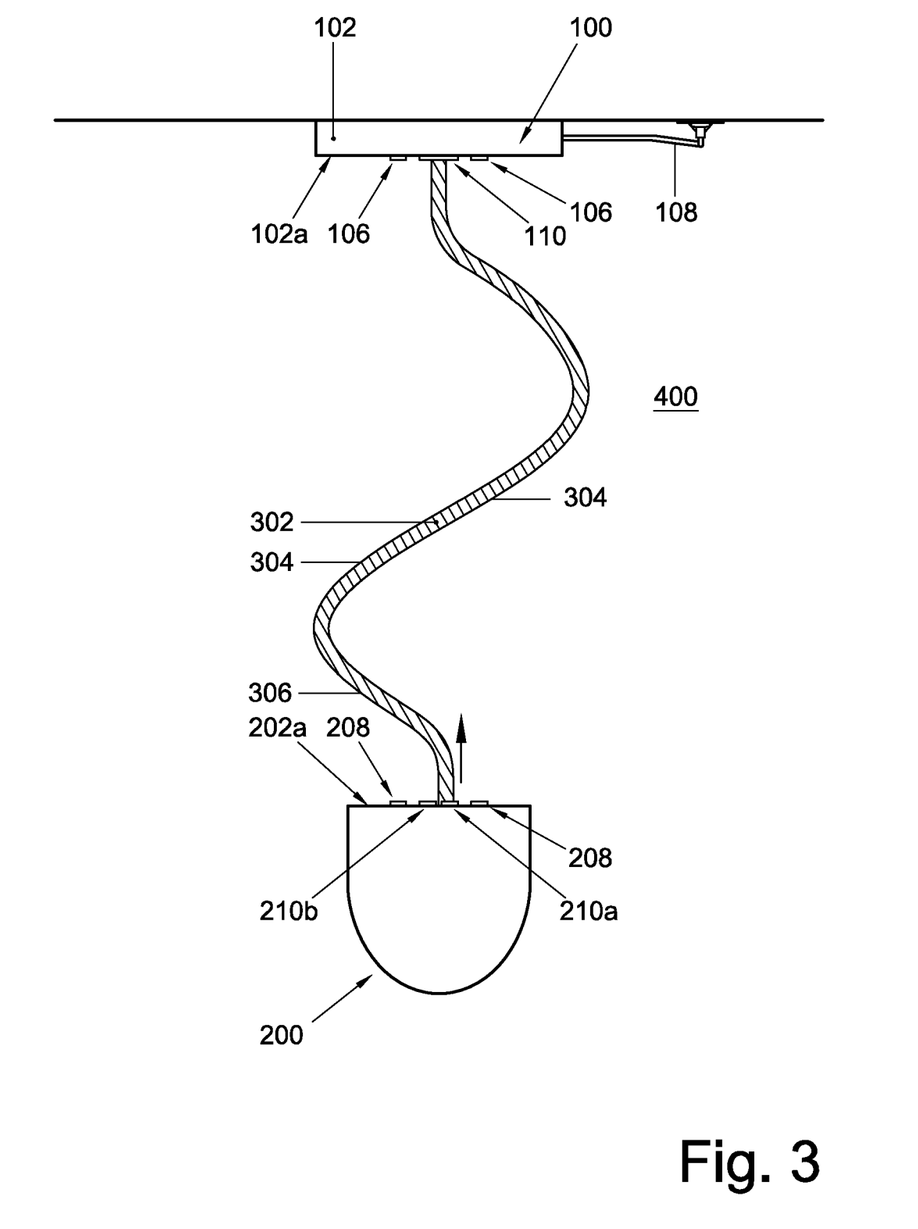
FIG. 3 is a schematic top view of the system of FIG. 1 during operation, illustrating how the robot follows a curved boundary portion of a guide signal reception field generated by a transmitter of the base station that projects the guide signal onto the floor.

In the embodiment of FIG. 3, the transmitter 110 is not configured to transmit the guide signal 300 over the floor 400, as in FIG. 2, but instead to project the guide signal onto the floor 400. Such an embodiment may rely on the guide signal 300 to be reflected off the floor 400 in order for it to be detectable and trackable by the robot 200. Accordingly, the reflection of the guide signal off the floor 400, rather than the guide signal incident on the floor, may define the guide signal reception field 302 that, in a floor-parallel plane at the tracking height of the robot 200, is bounded by a boundary portion 306 to be tracked. The guide signal sensors 210a, 210b may be 'desensitized' to the guide signal incident on the floor 400 by having them face the floor, such that only the reflected guide signal is detectable. An advantage of such an embodiment is that it enables the definition of a non-straight or curved guide path, such as the approximately sinusoidal guide path shown in FIG. 3.

Figure 4:
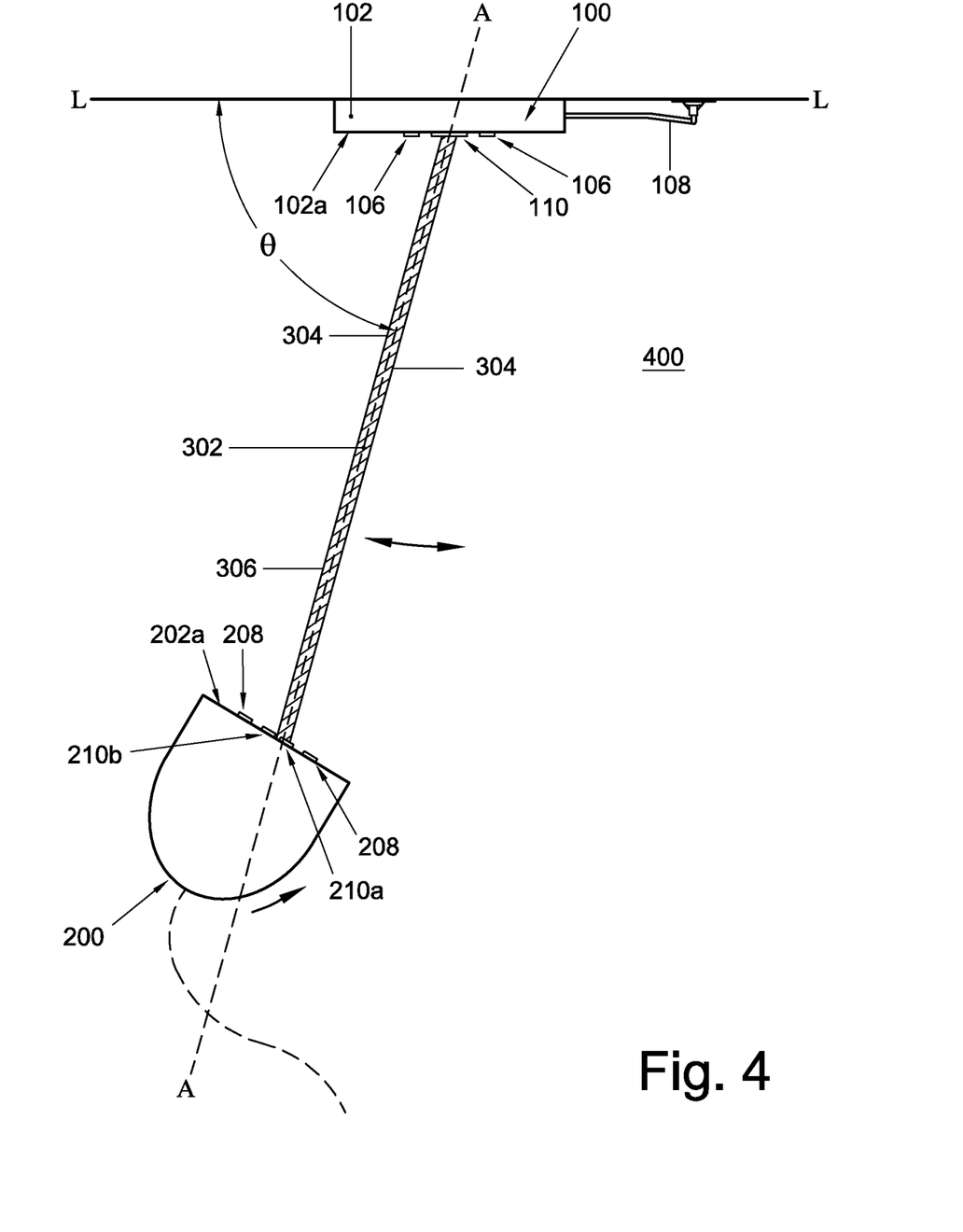
FIG. 4 is a schematic top view of the system of FIG. 1 during operation, illustrating how the robot follows a dynamic or moving boundary portion of a guide signal reception field, as if it were 'tethered' to the base station that generates it.

In the embodiment of FIG. 4, the transmitter 110 is configured to effect a dynamic, i.e. time-variable, guide signal reception field 302, as opposed to the static guide signal reception fields 302 shown in FIGS. 2-3. In the depicted situation, the transmitter 110 effects a narrow beam-shaped guide signal reception field 302 that extends over the floor 400; in an alternative embodiment, however, it may be projected onto the floor. The guide signal reception field 302 may have a central axis A, which, together with an arbitrary floor-parallel reference line L, may include an angle θ. As illustrated, the transmitter 110 may vary the position of the guide signal reception field 302 relative to the transmitter 110 with time by varying the direction into which it transmits the guide signal 300. That is, the transmitter 110 may be configured to time-vary the angle θ at which the central axis A of the guide signal reception field 302 extends relative to the reference line L. Consequently, the boundary portion 306 that is being tracked by the mobile robot 200 may extend in a variable boundary direction, and effectively move through space. In case the transmitter 110 varies the boundary direction slowly, and once the robot 200 has started tracking the boundary portion 306, the beam-shaped guide signal reception field 302 may effectively be regarded as a 'tractor beam' by means of which the robot 200 may be reeled in along a dynamic guide path determined by the transmitter 110.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

List of Elements
1 system
100 base station
102 housing
102a front side of base station housing
104 charger
106 charge terminals
108 power cord
110 transmitter
112 infrared light emitter
200 robot
202 housing
202a front side of robot housing
204 drive system
206 controller
207 rechargeable battery
208 charge connection terminals
210a, b first (a) and second (b) guide signal sensor
212a, b infrared light receiver of first (a) and second (b) guide signal sensor
300 infrared guide signal
302 guide signal reception field
304 boundary of guide signal reception field
306 tracked boundary portion of guide signal reception field
400 floor
A central axis of guide signal reception field
L reference line
θ angle of central axis of guide signal reception field

The invention claimed is:
1. A system, comprising:
a base station including a transmitter configured to transmit a guide signal into a guide signal reception field spatially bounded by at least one boundary portion; and
a mobile robot including:
a drive system configured to drive the robot across a floor;
two mutually adjacently disposed guide signal sensors, each of said sensors configured to generate a reference signal that reflects the sensor's reception of the guide signal; and
a controller operably connected to the drive system and the guide signal sensors, the controller configured to:
control the drive system to track the robot along the at least one boundary portion of the guide signal reception field back to the base station based on said reference signals, wherein a first one of said guide signal sensors is positioned substantially inside of the boundary portion of the guide signal reception field and a second one of said guide signal sensors is positioned substantially outside of the boundary portion of the guide signal reception field.

2. The system according to claim 1, wherein the boundary portion has a width of less than 10 mm within which width an intensity of the guide signal drops at least 75%.

3. The system according to claim 1, wherein the transmitter includes an infrared light emitter configured to emit an infrared guide signal, and wherein each of the guide signal sensors includes an infrared light receiver sensitive to the infrared guide signal from the infrared light emitter.

4. The system according to claim 1, wherein, in an Operational condition of the robot on the floor, the guide signal sensors are disposed at a substantially same height above the floor.

5. The system according to claim 1, wherein the boundary portion, as seen in a top view perpendicular to the floor, is substantially straight.

6. The system according to claim 1, wherein the transmitter is configured to project the guide signal onto the floor, such that the guide signal reception field is at least partly defined by a reflection of the guide signal off the floor, and wherein the boundary portion, as seen in a top view perpendicular to the floor is curved.

7. The system according to claim 1, wherein the transmitter is configured to vary a position of the guide signal reception field relative to the transmitter with time, so as to vary the position of the boundary portion.

8. The system according to claim 1, wherein the transmitter is configured to vary a shape of the guide signal reception field with time, so as to vary the shape of the boundary portion.

9. The system according to claim 1, wherein the base Station includes a housing with a generally flat front side having at least part of the transmitter mounted therein, wherein the robot includes a housing with a generally flat front side having said guide signal sensors mounted thereon, and
   wherein the transmitter is configured to produce a guide signal reception field at least one boundary portion extends substantially perpendicular to said front side of the housing of the base station, at least immediately adjacent said front side.

10. The system according to claim 1, wherein the mobile robot is a robotic vacuum cleaner.

11. A mobile robot for tracking a boundary portion of a spatially bounded guide signal reception field into which a guide signal is transmitted by a transmitter, said robot comprising:
   a drive system configured to drive the robot across a floor;
   two mutually adjacently disposed guide signal sensors, each of the sensors configured to generate a reference signal that reflects the reflects to the sensor's of the guide signal; and
   a controller that is operably connected to the drive system and the guide signal sensors, the controller configure to:
      control the drive system to move the robot, based on said reference signals,
      wherein a first one of said guide signal sensors is positioned substantially inside the boundary portion of the guided signal reception field and a second one of said guided signal sensors is positioned substantially outside the boundary portion of the guided signal reception field; and then tracking the robot along the boundary portion of the guided signal field back to the base station.

12. The mobile robot according to claim 11, wherein each of the guide signal sensors includes an infrared light receiver sensitive to an infrared guide signal.

13. The mobile robot according to claim 11, wherein, in an operational condition of the robot on the floor, the guide signal sensors are disposed at a substantially same height above the floor.

14. The mobile robot according to claim 11, wherein the guide signal sensors are spaced apart less than 10 mm.

15. A method of guiding a mobile robot to a base station, the method comprising:
   transmitting, a transmitter, a guide signal into a spatially bounded guide signal reception field;
   generating by each of two mutually adjacently disposed guided signal sensors a reference signal that represents the sensor's reception of the guided signal;
   moving, by a controller, the robot to position a first one of said guide signal sensors substantially inside the boundary portion of the guided signal reception field and a second one of said guide signal sensors substantially outside of said boundary portion of the guided signal reception field, in order to achieve an optimal contrast in an intensity of the reference signals; and
   then tracking, by the controller, the robot along the boundary portion of the guide signal field back to the base station.

* * * * *